United States Patent

Naito et al.

[15] 3,674,833
[45] July 4, 1972

[54] SALTS OF ETHYL O-(CYCLOHEXYLAMINO-ALKANOYLAMINO)-BENZOATE

[72] Inventors: Takeo Naito; Miyoshi Hirata; Sumiro Isoda, all of Tokyo, Japan

[73] Assignee: Daiichi Seiyaku Co., Ltd., Tokyo, Japan

[22] Filed: Feb. 18, 1970

[21] Appl. No.: 12,424

[30] Foreign Application Priority Data

Feb. 21, 1969 Japan...................................44/12593

[52] U.S. Cl. ..........................260/470, 260/471 R, 424/310
[51] Int. Cl.......................................................C07c 143/52
[58] Field of Search..............................260/470, 471, 471 R

[56] References Cited

UNITED STATES PATENTS 1,678,317  6/1928  Billeter et al. ..........................260/470
1,690,705  11/1928  Seydel ....................................260/471

OTHER PUBLICATIONS

Goldstein et al., " Principles of Drug Action," Harper & Row (1969), pgs. 206, 266.
Epstein et al., J. Am. Chem. Soc. 79 5,814 (1957)

*Primary Examiner*—Lorraine A. Weinberger
*Assistant Examiner*—John F. Terapane
*Attorney*—Oblon, Fisher & Spivak

[57] ABSTRACT

Novel anthranilic derivatives represented by the formula:

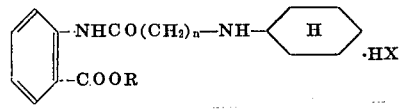

wherein R, n, and X are as defined hereinafter, have been found to be especially effective anesthetic drugs for fish.

5 Claims, No Drawings

SALTS OF ETHYL O-(CYCLOHEXYLAMINO-ALKANOYLAMINO)-BENZOATE

BACKGROUND OF THE INVENTION

1. Field of the Invention

This invention relates generally to novel anesthetic drugs for fish and more particularly to novel anthranilic derivatives represented by the following general formula:

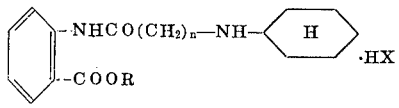

where R represents a lower alkyl group having one to three carbon atoms, n is 1 or 2, and X represents a residual radical of acids such as hydrochloric acid, nitric acid, sulfuric acid, phosphoric acid, acetic acid, succinic acid, or methanesulfonic acid.

2. Description of Prior Art

Transportation of live fish is becoming an ever-increasing necessity with the development of fish farming. It is desirable that the fish be transported in as fresh condition as possible in order to satisfy the high degree of human taste. Moreover, in view of the now flourishing fish pet industry, it is desirable that the fish suffer as little damage as possible during the transportation stage.

In order to economically transport live fish or to readily treat various fish diseases, it would be desirable to anesthetize the fish so that they will require less oxygen for survival. By this means, a greater number of fish can be transported in a single container because of the decreased expenditure of oxygen from the water. It was first thought that the fish could be treated for this purpose by use of the same type of anesthetics known effective for mammals. For example, ethyl p-aminobenzoate (hydrochloride),ethyldiethylaminoethyl-p-aminobenzoate (hydrochloride) and the like were considered, but these compounds were found to be inapplicable, since even their mineral acid salts are too sparingly soluble in water to be dissolved at the various limits of concentration necessary to provide the anesthetic effect. Furthermore, it is difficult to revive the fish using these types of compounds or their derivatives. Urethane series compounds have also been used in the prior art for fish anesthesia, but they must be used at a fairly high concentration to effect adequate anesthesia. The high concentrations necessary are an even more serious problem when it is considered that the urethanes are known to be carcinogenic. Accordingly, the use of anesthetics effective for mammals or warm-blooded animals cannot be similarly used for anesthetizing fish. This failure is due mainly to the fact that since fish belong to the family of cold-blooded organisms, they must be anesthetized rapidly. The anesthetic must be soluble in fresh water or marine water, and it must be intense in its action, yet it must be harmless to both fish and man. Moreover, the anesthesia must be capable of wearing off completely within a relatively short period of time.

While certain aminobenzoic acid derivatives, such as t-(cyclohexylamino-acetylamino)-benzoate which is the para isomer of one of the species of the present invention, have been synthesized and their anesthetic effect on warm-blooded animals such as guinea pigs or mice have been reported by Elias Epstein (J.Am. Chem.Soc. 79 5,814–5,817), there has been no reported literature showing the anesthetic effect of these materials on fish or cold-blooded animals. Moreover, the present invention is concerned with the ortho-derivative, and it has been found that the para-derivative is not effective within the context of this invention.

SUMMARY OF THE INVENTION

These and other objects have now herein been attained, and an especially suitable anesthetic for fish provided, by the use of the novel anthranilic compound having the formula:

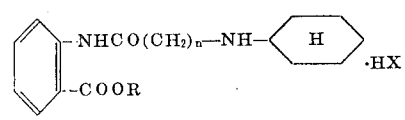

wherein R,n, and X have been disclosed above.

DETAILED DESCRIPTION OF PREFERRED EMBODIMENTS

The novel anthranilic esters of the present invention can be easily prepared by reacting an N-halogenoacylanthranilic acid lower alkyl ester with more than 2 moles of cyclohexylamine at a temperature of from 0° C to 200° C. The product can then be converted into a salt of any of the following acids: hydrochloric acid, nitric acid, sulfuric acid, phosphoric acid, acetic acid, succinic acid, or methanesulfonic acid.

Ethyl o-(cyclohexylaminoacetylamino)-benzoate hydrochloride ($n = 1$, $R = C_2H_5$, $X = Cl$) in (I). For example, using yellowtail (Seriola Quinqueradata), the effectiveness of this compound was compared with ethyl m-aminobenzoate (MS-222-Sandoz Co.,Ltd.), another commercially known fish anesthetic, the results of this comparison is tabulated in Tables I and II. In these Tables, the values X,n and R refer to the structural formula (I).

TABLE I

| Fish tested (water temp.) | Compound employed | Anesthetic time in concentration of— | | | |
|---|---|---|---|---|---|
| | | 10 p.p.m. | 30 p.p.m. | 60 p.p.m. | 100 p.p.m. |
| Carassius auratus (25° C.) | MS-222 | | | 4 min., 12 sec. | 13 min., 58 sec. |
| | Compd. (I):n=1, R=C₂H₅, X=Cl | 9 min., 37 sec. | 10 min., 3 sec. | 5 min., 38 sec. | |
| Cyprinus carpio (23° C.) | MS-222 | | | | 13 min., 14 sec. |
| | Compd. (I): n=1, R=C₂H₅, X=Cl | 10 min., 48 sec. | 12 min., 10 sec. | 6 min., 41 sec. | |
| Fugu niphobles (24° C.) | MS-222 | | 16 min., 59 sec. | 2 min., 04 sec. | 0 min., 50 sec. |
| | Compd. (I): n=1, R=C₂H₅, X=Cl | 6 min., 20 sec. | 2 min., 38 sec. | 1 min., 26 sec. | 0 min., 49 sec. |

TABLE II

| Fish tested (water temp.) | Compound employed | Anesthetic time in concentration of— | | | |
|---|---|---|---|---|---|
| | | 5 p.p.m. | 12.5 p.p.m. | 25 p.p.m. | 50 p.p.m. |
| Seriola macrocephalus (22.3° C.) | MS-222 | | | 8 min., 25 sec. | 5 min., 00 sec. |
| | Compd. (I): n=1, R=C₂H₅, X=Cl | | 1 min., 45 sec. | 1 min., 20 sec. | 0 min., 40 sec. |
| | Compd. (I): n=1, R=C₂H₅, X=CH₃SO₃ | | 2 min., 15 sec. | 1 min., 20 sec. | |
| Oplegnathus fasciatus (22.8° C.) | MS-222 | | | | |
| | Compd. (I): n=1, R=C₂H₅, X=Cl | | 7 min., 02 sec. | 2 min., 35 sec. | |
| | Compd. (I): n=1, R=C₂H₅, X=CH₃SO₃ | | 6 min., 07 sec. | 2 min., 42 sec. | |
| Girella punctata | MS-222 | | | 8 min., 20 sec. | 3 min., 05 sec. |
| | Compd. (I): n=1, R=C₂H₅, X=Cl | | 1 min., 55 sec. | 1 min., 13 sec. | 0 min., 45 sec. |
| | Compd. (I): n=1, R=C₂H₅, X=CH₃SO₃ | | 3 min., 15 sec. | 1 min., 48 sec. | 1 min., 01 sec. |

This data was obtained by the following procedure: The fish were immersed in a solution containing various concentrations of each compound. The anesthetic time was represented by the required time for anesthesia after immersion. Anesthesia was considered that point at which the fish became completely immobilized or remained relatively motionless. Following anesthesia, the fish were transferred into water without the drug and complete recovery was recognized.

The various isomers (ortho-, meta-, and para-) of ethyl o-(cyclohexylaminoacetylamino)-benzoate hydrochloride were also compared and the results tabulated in Table III.

TABLE III
[Anesthetic time and other properties]

| | Ortho-deriv. in above formula | | Metha-deriv. in above formula | | Para-deriv. in above formula | |
|---|---|---|---|---|---|---|
| | n=1 | n=2 | n=1 | n=2 | n=1 | n=2 |
| Anesthetic time, min./sec. — In concentration of 60 p.p.m. | 12 min., 32 sec. | 5 min., 00 sec. | 8 min., 17 sec. | 12 min., 45 sec. | Not anesthetized. | 7 min., 45 sec. |
| In concentration of 100 p.p.m. | 7 min., 08 sec. | 3 min., 35 sec. | 19 min., 45 sec. | 6 min., 25 sec. | Not anesthetized. | 7 min., 08 sec. |
| Solubility (g./ml.) | 1/20 | | 1/350 | | 1/300000 | |
| Recovery time (minutes) | <10 | <10 | 15–60 | | | |
| Toxicity on mouse (LD$_{50}$: mg./kg.) | 48.7 i.v. 2,000 i.p. | | | | | |

Fish tested: Gold fish (*Carassius auratus*), temperature: 19–25° C.

As can be seen from Table III, the ortho-derivatives of the series are shown to be the most effective from the point of view of rapid anesthesia within a short time period and from the point of view of rapid recovery of the fish to normal activity.

In general, it has been considered that the higher the anesthesia potency, the stronger is the toxicity. However, using the compounds of the present invention, judged by the brief recovery period shown in the experimental data for the ortho-derivatives, this generalized statement, which is so frequently applicable to warm-blooded animals, is not applicable to fish. The tables also show that the recovery time using the meta- or para-derivatives of the same series is several times as long as that using the ortho-derivatives. It has also been observed that in the case of meta- or para-derivatives, the fish become violently agitated at the recovery from the anesthesia. These experimental results lead us to the conclusion that only the ortho-derivative is suitable as an anesthetic drug for fish.

The suitable concentration of the present compound in its application varies depending upon the type of fish, the body weight of the fish, and the temperature of the water. Usually, concentrations of between 10 ppm and 100 ppm provide sufficient anesthesia, yet permits rapid recovery when the fish are removed from the drug. This low concentration is especially significant in view of the fact that MS–222 requires 50 ppm to 500 ppm and those of the urethane series requires 5,000 to 50,000 ppm.

In using the drug compounds of the present invention, any suitable method for application such as direct spraying, bathing or immersing and direct administration can be used depending upon the specific type of fish and the body weight.

Another advantage of the compounds of this invention is that their solubility is sufficiently high, both in fresh water and in marine water for wide practical application. The hydrochloric acid salt, as well as the other acid salts, are rapidly dissolved in both fresh water or marine water, and their solutions are harmless to both fish and man.

Synthesis of the present compounds can be easily accomplished by known processes. For example, ethyl o- (β-cyclohexylamino)propionyl-amino)-benzoate (hydrochloride) can be prepared by reacting ethyl ortho-(β-chloropropionyl)amino)-benzoate with cyclohexylamine in benzene, followed by treatment with an alcoholic hydrochloride.

Having generally described the invention, a further understanding can be obtained by reference to certain specific examples which are provided herein for purposes of illustration only and are not to be considered as being limiting in any manner.

EXAMPLE 1 (Synthesis)

To 50 ml of benzene 10 g of ethyl o-(β-chloropropionyl)-amino)-benzoate was dissolved and 12 g of cyclohexylamine was added. The mixture was refluxed for 4 hours, cooled to room temperature, and cyclohexylamine precipitate was filtered off. The filtrate was concentrated to a syrup in vacuo and the syrup was dissolved in chloroform. The chloroform solution was washed with water and dried with sodium sulfate.

To the chloroform solution alcoholic hydrochloric acid was added. Ether was then added to the solution to precipitate the product in needle-like crystals which were collected and recrystallized from ethanol-ether to give 10.8 g of ethyl o-(β-cyclohexylamino)propionyl-amino)-benzoate hydrochloride melting at 188°–199° C.

Analysis calculated for $C_{18}H_{26}N_2O_3 \cdot HCl$
C 60.92%, H 7.67%, N 7.89%
found
C 60.50%, H 7.58%, N 7.65%

In substantially the same manner as described above, the following compounds were obtained:

Methyl o-(N-cyclohexylaminoacetyl-amino)-benzoate hydrochloride
M.P. 174°–176° C (decomposed)

Ethyl o-(N-cyclohexylaminoacetylamino)-benzoate hydrochloride
M.P. 232°–235° C

Ethyl o-(N-cyclohexylaminoacetylamino)-benzoate methanesulfonate
M.P. 143°–145° C Ethyl o-(N-cyclohexylaminoacetyamino)-benzoate (Oily Product)

EXAMPLE 2

To two liters of water treated with ion-exchange resin, 60 mg of ethyl o-(N-cyclohexylaminoacetylamino)-benzoate hydrochloride was added and 5 gold fishes (Carassius auratus) having 5 g of average body weight were added to the water. All the fish were anesthetized to lie still within 30 seconds to 2 minutes after immersing. When those anesthetized fishes were transferred into fresh water without the drug, the fish were revived within 2 minutes.

EXAMPLE 3

To two liters of water treated with an ion-exchange resin, 200 mg of ethyl o-(N-cyclohexylaminoacetylamino)-benzoate hydrochloride was added and 5 common carps (Cyprinus carpio) having an average body weight of 7 g. were added to the water. All the fish were anesthetized 5 minutes after immersion. When transferred into fresh water without drug they were revived within 2 minutes.

EXAMPLE 4

Into 6 liters of artificial marine water was dissolved 500 mg of ethyl o-(N-cyclohexylaminoacetylamino)-benzoate hydrochloride and 5 black porgies (Mylio macrocephalus) weighing 20 to 30 g of the body weight were added to the water. All the fish were anesthetized within about 5 to 7 minutes immersion. When the anesthetized fishes were transferred into fresh artificial marine water without the drug, they were revived within 5 minutes.

EXAMPLE 5

Into two liters of artificial marine water, 60 mg of ethyl o-(N-cyclohexylaminoacetylamino)-benzoate hydrochloride was dissolved and 5 puffers (Fugu niphobles) weighing 2 to 3 g of body weight were added thereto. All the fish were anesthetized within about 2 minutes after immersion. When the anesthetized fishes were transferred into fresh artificial marine water, they were revived within 4 minutes.

Having fully disclosed the invention, it will be apparent to one of ordinary skill in the art that many changes and modifications can be made without departing from the spirit or scope thereof. Accordingly,

What is claimed and intended to be covered by letters patent is:

1. A compound represented by the following formula:

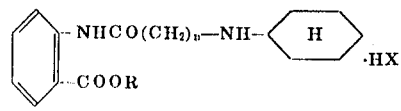

wherein R is ethyl, $n$ represents 1 or 2, and X represents a residual radical of acid selected from the group consisting of hydrochloric acid, nitric acid, sulfuric acid, phosphoric acid, acetic acid, succinic acid, and methanesulfonic acid.

2. The compound of claim 1 which is Ethyl o-(cyclohexylaminoacetyl-amino)-benzoate hydrochloride.

3. The compound of claim 1 which is Ethyl o-(cyclohexylaminoacetyl-amino)-benzoate methane-sulfonate.

4. The compound of claim 1 which is Ethyl o-(($\beta$-cyclohexylamino) propionylamino)-benzoate hydrochloride.

5. The compound of claim 1 which is Ethyl o-(cyclohexylaminoacetyl-amino)-benzoate.

* * * * *